VACUUM DEPOSITION APPARATUS

Filed Sept. 1, 1966 3 Sheets-Sheet 1

INVENTOR.
GEORGE D. ADAMS
BY
Charles C. Wells
ATTORNEYS

INVENTOR.
GEORGE D. ADAMS
BY
ATTORNEYS

March 24, 1970 G. D. ADAMS 3,502,051

VACUUM DEPOSITION APPARATUS

Filed Sept. 1, 1966 3 Sheets-Sheet 3

INVENTOR
GEORGE D. ADAMS

BY

Glenn E. Coy
Charles C. Wells
ATTORNEYS

United States Patent Office 3,502,051

Patented Mar. 24, 1970

3,502,051

VACUUM DEPOSITION APPARATUS

George D. Adams, 518 Harold's Drive NW., Huntsville, Ala. 35806

Filed Sept. 1, 1966, Ser. No. 577,115
Int. Cl. B05c *11/00;* C23c *13/00*
U.S. Cl. 118—11 6 Claims

ABSTRACT OF THE DISCLOSURE

The invention disclosed is an apparatus used to form thin film inductive windings. The apparatus comprises both a source of conductive and insulative coatings with appropriate masking means to effect a continuous deposit of the various layers of the thin film inductor. A conical chamber is mounted above the coating sources and is divided into two separate passageways by a partition. The substrate to be coated is mounted above the coating sources and can be rotated into the appropriate position by suitable means pivotally mounted in the housing section of the apparatus. A vacuum is created within the apparatus and the coatings are heated and evaporated so as to form continuous alternate layers of conductive and insulative coatings upon the rotating substrate.

This invention relates in general to apparatus for fabrication of thin film electrical components and other microcircuitry. More specifically, this invention is an apparatus whereby thin film inductive windings, transformers, integrated inductor-capacitor circuits, and large area capacitors having improved characteristics may be fabricated quickly and simply in a continuous process utilizing vacuum deposition.

Thin film electrical components and related microcircuitry is of vital importance to the space program in reducing the size and weight of manned and unmanned payloads. For example, an electronic device formerly occupying a two cubic inch package when fabricated using conventional components and high density packaging techniques can now be fabricated on a thin piece of substrate material approximately one-half inch square. Thus, complex electronic circuits incorporated in on-board equipment can be reduced in size and weight bringing about a corresponding reduction in size and weight of the on-board equipment.

Two of the most difficult problems encountered in the fabrication of vacuum-deposited thin film circuits heretofore has been depositing inductors and capacitors of sufficient values for general application. The present invention greatly facilitates fabrication of the aforementioned components, as well as many other electrical components, such as multiple tapped transformers of both air and metal core types. The use of this method can increase the power-handling capacity of thin film components and related circuits to a considerable extent.

Apparatus in use heretofore for the deposition of thin film capacitors have not been entirely satisfactory, for in order to achieve greater capacitance values, there must be numerous layers deposited. By past apparatus this involves a substantial number of separate operations and recycling of an apparatus in order to obtain the needed plate area, since the layers were not deposited continuously, that is, they were not formed in a continuous ribbon.

The invention avoids the disadvantages discussed above and provides apparatus for depositing thin film electrical components, including inductors, quickly in a continuous ribbon-like fashion. The invention can also be employed in industry other than the space industry wherein microcircuitry incorporating thin film components can solve problems of size and weight. For example, hearing aids, and other bio-electronic devices are readily suited to the use of microcircuitry.

A method practical in accordance with this invention comprises the following procedure for the fabrication of electronic circuitry and components. A substrate upon which the circuit or component is to be formed is rotated above a mask having openings or apertures spaced thereabout. The size and shape of the openings is controlled by an aperture control. The entire assembly is placed in a vacuum chamber above a source of conductor vapor and a source of insulator vapor, disposed in separate chambers below the mask so that portions of the substrate are exposed to the vapors as the substrate rotates. When these sources are heated, alternate and continuous layers of conductor and insulation are deposited on the rotating substrate.

It is an object of this invention to provide apparatus by which continuous helical layers of conductor and insulator material can be deposited to form super-imposed windings on the same radius.

Other objects and attendant advantages of the present invention will become more apparent when considering the following detailed description in conjunction with the drawings wherein.

Figure 1:
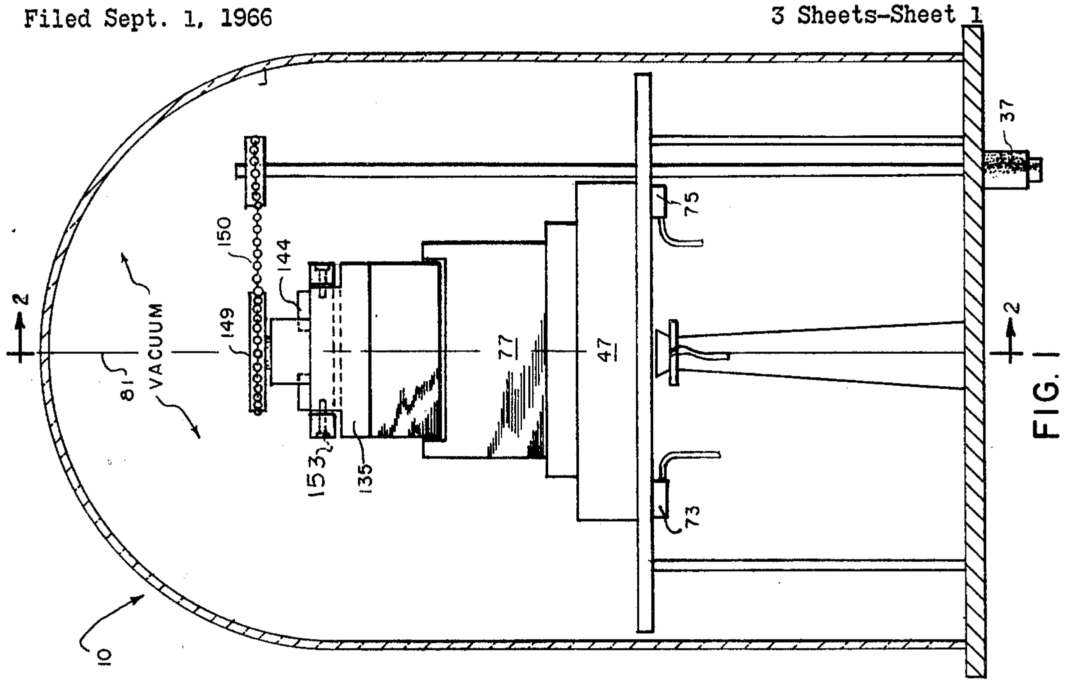
FIGURE 1 is a side elevation of an apparatus for depositing thin film induction devices and capacitors.
Figure 2:
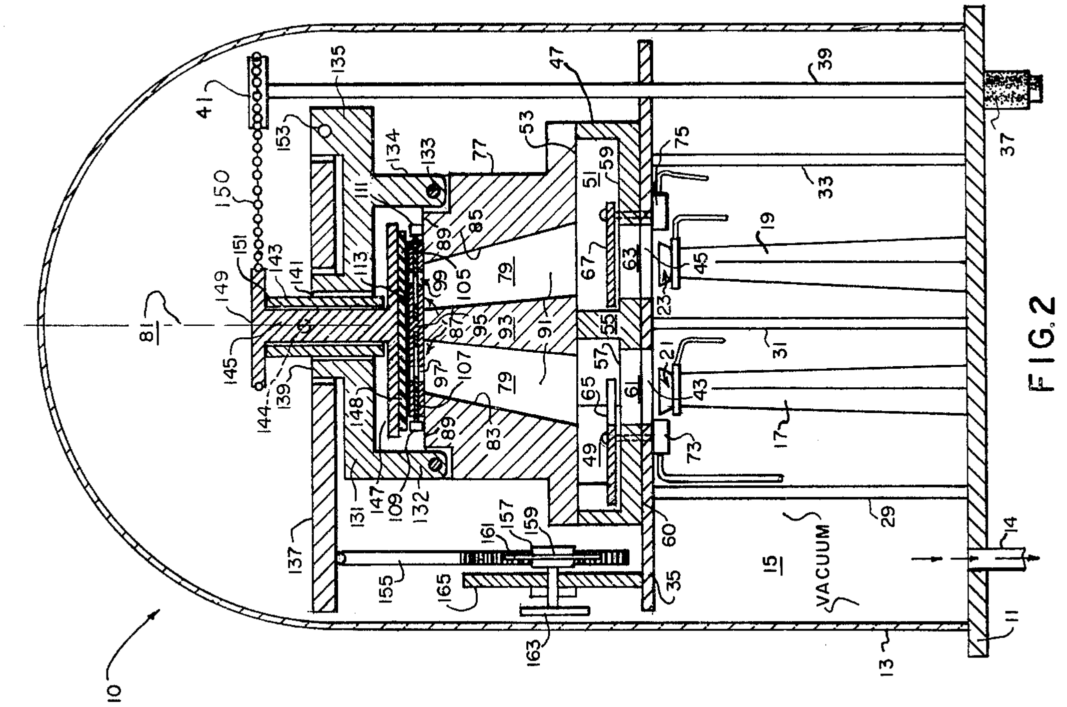
FIGURE 2 is a cross-sectional view taken along lines 2—2 of FIGURE 1.

Referring now to the drawings and in particular to FIGURES 1 and 2 showing an apparatus 10 for depositing thin film electrical components by a continuous process. It includes a circular chamber base plate 11 which supports a transparent bell jar 13, defining a chamber 15. The chamber 15 is adapted to be evacuated through a port 14 in the base plate 11 by conventional means (not shown).

Elongated supports 17 and 19 rest upright upon base 11 and support sources 21 and 23 containing materials to be vaporized and deposited. For example, source 23 contains insulator material. These sources can be of any conventional type.

Three vertical supports 29, 31, and 33 extend upward to support a circular support plate 35 upon which the greater part of the apparatus rests. Plate 11 supports a motor 37 exterior to chamber 15. A shaft 39 is connected to motor 37 which rotates the shaft and sprocket 41 attached to the shaft. Plate 35 has rectangular openings 43 and 45 that permit passage of rising source vapors.

Figure 3:
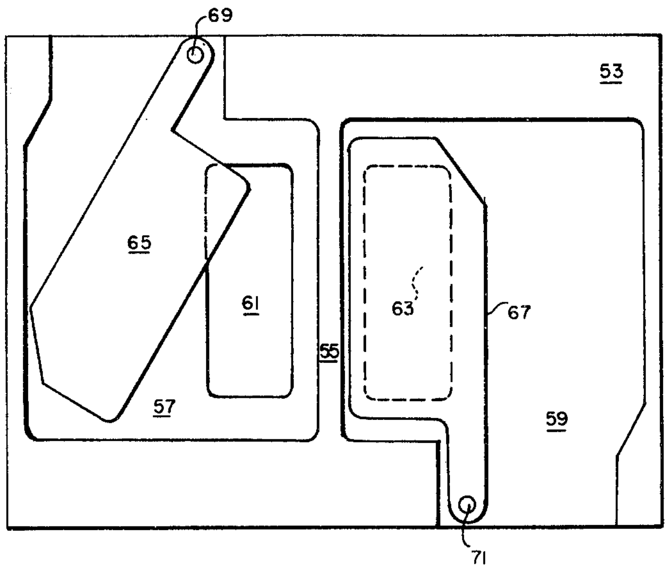
FIGURE 3 is a plan view of a plate assembly which is disposed between the vapor sources and mask.

Attached to plate 35 is a rectangular plate 47, also shown in FIGURE 3, having rectangular cavities 49 and 51 formed therein that are located symmetric with and on opposite sides of a partition 55 that divides plate 47 in half, as measured along the longest dimension of plate 47. Plate 47 has openings 61 and 63 formed therein that extend downward from bottom surfaces 57 and 59 of recessed cavities 49 and 51 to bottom 60 of plate 47. Openings 61 and 63 are aligned with openings 43 and 45 in plate 35, respectively, so that vapors from sources 21 and 23 may rise through them.

Referring to FIGURES 2 and 3, bottoms 57 and 59 of cavities 49 and 51, respectively, serve as pivot planes upon which source shutters 65 and 67 are attached and pivoted. Shutters 65 and 67 fit flush with bottoms 57 and 59 of cavities 49 and 51, respectively, and may be rotated about pivot points 69 and 71 by electrically operated rotating switches 73 and 75 to close openings 61 and 63 and thus prevent the source vapors from rising further. Bottoms 57 and 59 of cavities 49 and 51 form areas sufficient for rotation of source shutters 65 and 67 to opened and closed positions.

A rectangular block 77 is attached to and rests upon top surface 53 of plate 47. Block 77 includes a truncated conical chamber 79 which is symmetric about a central axis of rotation, designated 81, normal to plate 35. Sides 83 and 85 of chamber 79 slope inward so that upper end 87 of chamber 79 is smaller than bottom opening 91 in block 77.

Chamber 79 is shown divided into two equal chambers by a wall or partition 93. Chamber 79 can be, when necessary for certain depositing operations, divided into four equal chambers, and a type of flue arrangement (not shown) may be incorporated so that only two sources, one of conductor and one of insulator material, are employed to supply four chambers with vapors.

Figure 4:
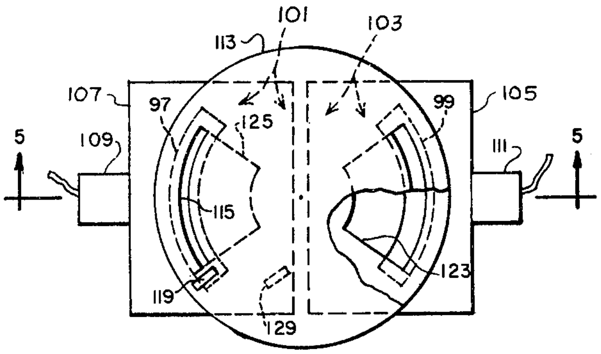
FIGURE 4 is a plan view of a mask carrier and a mask used for depositing a single insulated winding with end connections, and aperture controls.
Figure 5:
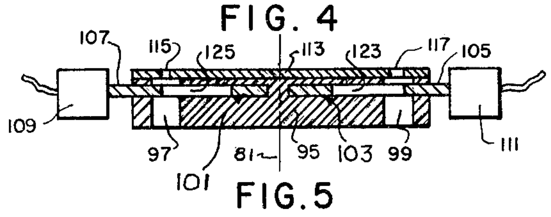
FIGURE 5 is a view in section taken along lines 5—5 of FIGURE 4.

A mask carrier (FIGURE 2) is attached to and rests upon top surface 89 of block 77. Mask carrier 95, shown detailed in FIGURES 4 and 5, is symmetric about central axis 81 and is a disc having two arc openings 97 and 99 located equal radial distances from central axis 81 and diametrically opposite one another. Mask carrier 95 is also provided with horizontal slots 101 and 103 in which slide aperture controls 105 and 107. Controls 105 and 107 are actuated by solenoids 111 and 109.

Mask 113 is attached to and rests upon mask carrier 95. The mask is circular in shape with slotted exit apertures 115 and 117 located therein in a circular pattern about axis 81.

Exit apertures 115 and 117 form arcs and are located above their respective sources with exit aperture 115, through which conductor material is deposited, being more narrow than exit aperture 117, through which insulator material is deposited. Exit aperture 117 is wider than exit aperture 115 in order to assure proper insulation of the conductor film as it is deposited in a continuous process.

There is also a connecting aperture 119 located in the mask 113. It is rectangular in shape and located at the end of conductor arc 115. Its function is to deposit connections from the windings to the connecting lands so that the elements may be connected in thin film circuits or microcircuits.

Aperture controls 105 and 107 are rectangular tabs with pie-shaped openings 123 and 125 centrally located therein so that the arc length of exit apertures 117 and 115 may be shortened or lengthened, respectively, as controls 105 and 107 are pulled out of or pushed into slots 103 and 101 provided in mask carrier 95. Connection land opening 129 is provided in aperture control 107 and exposes connection land opening 119 in the mask to permit the passage of vapors only when exit aperture 115 is completely closed off by pulling control 107 out a proper distance by operation of solenoid 109. This allows the making of connections from conductor to connection lands, and there is no interference with deposition of the conductor or insulation because that phase of the method is stopped.

Referring to FIGURE 2, there is illustrated a pivot table or pivotally mounted housing comprising a horizontal plate member 131 from which extend downward two vertical supports 132 and 134 with vertical support 134 being pivotally attached to block 77 by pivot connection 133. The pivot table includes a rectangular pedes'al 135 provides a means for mounting pivot platform 137.

The pivot table includes a raised annular shoulder 139 located symmetrically about central axis 81. Shoulder 139 has a circular opening 141 extending through plate member 131 in order to allow a shaft bearing 143 mounted therein to move along axis 81 with some degree of freedom.

Bearing 143 encloses a drive shaft 145, connected at its lower end to a substrate holder 147. The substrate holder is rotated by drive shaft 145 having sprocket 149 mounted thereon. Sprocket 149 is rotated by chain 150 which is driven by electric motor 37, shaft 39, and sprocket 41. Sprocket 149 rides on surface 151 of bearing 143. Substrate holder 147 is a flat disc to which substrate 148 is attached.

Bearing 143 is pivotally connected by pin 144 (see FIGURE 1) to pivot platform 137 so that when pivot platform 137 is rotated in a vertical plane, bearing 143 together with shaft 145 will remain parallel with axis 81, and thereby the plane of substrate 148 and substrate holder 147 will remain parallel to the plane of mask 113, when the height of the substrate above the mask is adjusted by a mechanism discussed hereafter.

Pivot platform 137 is a flat plate which is pivotally connected by pin 153 to pedestal 135 of the pivot table, and the other end of platform 137 is in contact with an adjustment post 155. Adjustment post 155 is vertical and can be raised or lowered to pivot platform 137 and thus, due to the pivot connection discussed above between platform 137 and bearing 143, the substrate and mask remain parallel with respect to one another when platform 137 is pivoted. Post 155 is held secure by a cylindrical bracket 157 which has a lateral slot opening 159 down its lateral dimension. Slot 159 provides an access opening through which a gear 161 operates. Gear 161 is shaft connected to adjustment nut 163. Bracket 157 is attached to and supported by a vertical member 165 which is attached to and supported at its lower end by support plate 35. Post 155 has teeth 158 formed thereon which are engaged by gear 161 so that rotation of gear 161 will raise or lower post 155.

Figure 9:
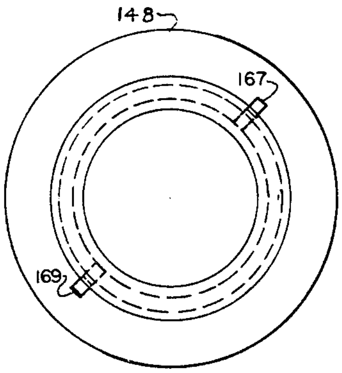
FIGURE 9 is a substrate with deposited windings connected to connection lands.

The apparatus is prepared for depositing a single insulated winding on a substrate in the following manner. Substrate 148 is prepared to receive the winding by predepositing metallic starting and ending connection lands thereon before the winding is started. The mask used is mask 113 shown in FIGURE 4. Substrate 148 is then attached to substrate holder 147 and aligned with starting connection land 167, shown in FIGURE 9, located above conductor aperture 115 (see FIGURE 4). The thickness of deposited films is determined by the evaporation rate of sources 21 and 23, which may be referred to as a source unit; the arc length of exit apertures 115 and 117; and the speed of rotation of substrate 148. Adjustment post 155 is adjusted to bring substrate 148 within the proper distance above mask 113. Vacuum chamber 15 is evacuated to the proper point for evaporating the materials used (normally $5\times10^{-5}$ torr).

Source shutters 65 and 67, mounted between sources 21 and 23 and mask 113 to allow opening and closing the vapor path to substrate 148, are now closed, and sources 21 and 23 are brought to a proper temperature for a desired evaporation rate. Aperture control 107 is adjusted by solenoid 109 in order to expose connection aperture 119 by means of aperture 129 and close exit aperture 115. Aperture control 105 is adjusted by solenoid 111 for the desired insulator deposition. Shutter 65 is opened by the rotating switch 73, and the connection to connection land 167 (see FIGURE 9) is deposited and shutter 65 is closed. Aperture control 107 is adjusted by solenoid 109 to expose exit aperture 115 through which the conductor is deposited. Shutters 65 and 67 are opened and substrate 148 is immediately placed in controlled rotation by an electric motor 37 which drives sprockets 41 and 149 through shaft 39 and chain 150. As the apparatus operates, each vapor source 21 and 23 deposits a thin film helix on substrate 148. The radius of the helix deposited is determined by the radial distance of exit apertures 115 and 117 from axis 81. With apertures 115 and 117 at equal radial distances from axis 81, multi-turn helices of conductor and insulator are deposited one upon the other, with each succeeding source either 21 or 23, in the direction of rotation, depositing a layer upon the preceding layer. The operation is continued until the desired number of turns are deposited. Each revolution of substrate 148 deposits one turn. It is then stopped in line with ending connection land 169 (see FIGURE 9) and shutters 65 and 67 are closed. Connecting the end of the winding to connection land 169 may be done by a separate operation after removing substrate 148 from the vacuum chamber, or it may be carried out by operating solenoid 109 to move aperture control 107 to a position wherein aperture 129 is aligned with connection aperture 119 in mask 113. Shutter 65 is opened and conductor vapor rises through exposed openings 43, 61, 79, and 97 and is deposited upon substrate 148 through aperture 119.

Figure 6:
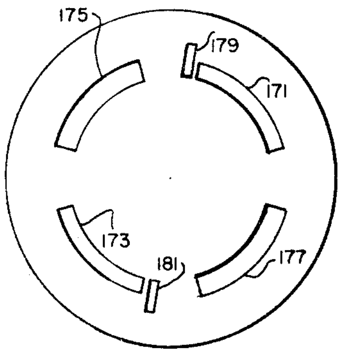
FIGURE 6 is a mask with exit apertures arranged for depositing multiple windings on the same radius and apertures for connecting the ends of the windings to pre-deposited connection lands.
Figure 7:
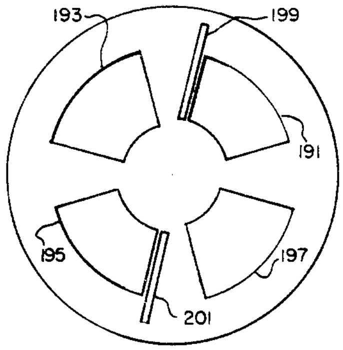
FIGURE 7 is a mask for depositing helical capacitors with their connections.
Figure 8:
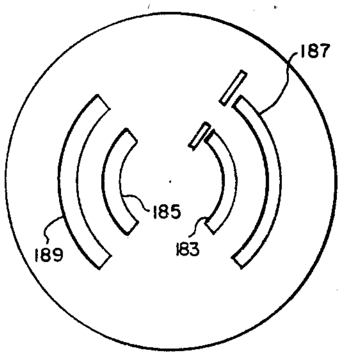
FIGURE 8 is a mask for depositing multiple windings of different radii together with their connections.

FIGURES 6 through 8 show masks with aperture configurations for depositing other components. Certain modifications (not shown) of the apparatus shown in FIGURE 2 may be made in order to operate the apparatus using masks shown in FIGURES 6 through 8. The masks may be used without aperture controls, or aperture controls may be incorporated. A flue arrangement (not shown) may be incorporated when four separate chambers, that is two source units, are required.

Multiple insulated windings on the same radius are deposited with the mask shown in FIGURE 6 which requires a source unit and a pair of connection lands for each winding. Exit apertures 171, 173, 175, and 177 are placed on the same radius and are alternated, each conductor aperture 171 and 173 followed by an insulator aperture 175 and 177, respectively, in the direction of rotation. Connection lands are so located on the substrate that alignment of the starting land for the first winding with the conductor aperture will align each succeeding conductor aperture with the appropriate starting land. The same applies to the ending connection lands. Connection apertures 179 and 181 are provided in the mask and may be used if aperture controls are used to expose the apertures at the necessary times.

Concentric windings on different radii are deposited using the mask shown in FIGURE 8 by the same procedure as above except that apertures 183 and 185 form one of the concentric windings, and apertures 187 and 189 form another of the concentric windings. Only one source unit is required. Each pair of apertures 183 and 185 are located on the same radius but on a different radius than the other pair 187 and 189.

Capacitors are deposited by the same procedure described above except that a different mask, shown in FIGURE 7, is used. Exit apertures 191, 193, 195, and 197 are wider to provide a greater area per turn and only starting connection lands are required. Connection apertures 199 and 201 are provided therein.

Integrated L-C circuits are easily deposited by the use of the procedure described for single insulated windings. The desired inductance and capacitance being known the winding area and number of turns to achieve the desired inductance are determined. The capacitance is adjusted to the desired value using the area per turn from the inductance calculations, the dielectric constant, and the thickness of the insulator. The width of the conductor is then adjusted to give the desired distributive capacitance between any two turns.

From the foregoing, it can be seen that the applicant has invented an apparatus for fabricating thin film electrical circuit components and microcircuitry by a continuous and simple operation utilizing vacuum deposition.

What is claimed is:

1. An apparatus for the vacuum deposition of thin film electrical circuit components comprising in combination, a container adapted to be evacuated to form a vacuum chamber, separate sources of insulator material and conductor material to be vaporized, said sources being positioned in said vacuum chamber, a support means mounted in said chamber above said sources having passageways therein for the flow of vapors from the sources, said support means including:

a first plate having openings therein that are positioned immediately above the sources of the material to be vaporized, a second plate mounted on said first plate and having openings therein that are in alignment with the openings in said first plate, said second plate further including shutter means for opening and closing the openings in said second plate to control the flow of vapors from the sources of materials, and a block mounted on said second plate having a conical chamber formed therein that is divided into two passageways by a partition, said two passageways being in alignment with the openings in said first and second plates, a housing pivotally mounted on said support means, adjustment means mounted between said housing and said support means for adjusting the position of said housing relative to said support means, a substrate holder pivotally mounted in said housing over the passageways in said support means whereby a substrate mounted on said substrate holder will always assume a horizontal position relative to said support means and sources for vapor deposition thereon, a mask carrier for supporting a mask mounted on said support means in a position between the support means and said substrate holder, and drive means mounted in said vacuum chamber and connected to said substrate holder for rotating said substrate holder relative to said support means when vapor deposition is to be performed.

2. The apparatus recited in claim 1 wherein:

said substrate holder includes a flat plate from which extends an upstanding driveshaft member that is connected to and driven by said drive means, a bearing member is pivotally mounted in said housing, and said driveshaft member is supported for rotation in said bearing member,

3. The apparatus recited in claim 2 wherein said mask carrier means includes:

a disc with two arcuate slots that are diametrically opposed and positioned equal distances from the center of said disc for the vapor deposition of superimposed coils, and two aperture control plates having wedge shaped openings formed therein slidably mounted in said disc and positioned so that the wedge shaped openings in said aperture control plates are aligned with the arcuate slots in said disc, whereby movement of said aperture control plates relative to said disc will vary the effective length of said arcuate slots.

4. The appartus recited in claim 3 which further includes electrical control means connected to said mask carrier means for controlling the movement of said aperture control plates relative to said disc.

5. The apparatus recited in claim 4 wherein said disc and one of said aperture control plates has rectangular openings therein that can be aligned by movement of said one aperture control plate to provide a passage for the deposition of connections to deposited coils.

6. The apparatus recited in claim 5 which further comprises an electrical control means for actuating the shutter means in said second plate to open and close the openings in said second plate.

References Cited

UNITED STATES PATENTS

| | | | |
|---|---|---|---|
| 3,431,144 | 3/1969 | Yawata et al. | 112—212 |
| 3,271,180 | 9/1966 | White | 117—38 |
| 3,230,109 | 1/1966 | Domaleski | 117—38 |
| 3,205,855 | 9/1965 | Ault | 117—38 |
| 2,740,928 | 4/1956 | Ward | 117—106 |
| 2,947,651 | 8/1960 | Toohig | 117—106 |
| 3,117,025 | 1/1964 | Learn et al. | 118—49 |
| 3,082,124 | 3/1963 | French et al. | 118—49 X |
| 2,969,296 | 1/1961 | Walsh | 118—49 X |
| 2,799,600 | 7/1957 | Scott | 118—49 X |

ALFRED L. LEAVITT, Primary Eraminer

A. GRIMALDI, Assistant Examiner

U.S. Cl. X.R.

118—49

PO-1050
(5/69)

UNITED STATES PATENT OFFICE
CERTIFICATE OF CORRECTION

Patent No. 3,502,051 Dated March 24, 1970

Inventor(s) George D. Adams

It is certified that error appears in the above-identified patent and that said Letters Patent are hereby corrected as shown below:

Immediately after the abstract. Column 1, and before line 28 insert the following;

-- The invention described herein was made by an employee of the United States Government and may be manufactured and used by or for the Government for governmental purposes without the payment of any royalties thereon or therefor--.

SIGNED AND SEALED
SEP 1 - 1970

(SEAL)
Attest:

Edward M. Fletcher, Jr.
Attesting Officer

WILLIAM E. SCHUYLER, JR.
Commissioner of Patents